May 1, 1923.
G. H. WONG
1,453,372
CONVERTIBLE AUTOMOBILE BODY
Filed Oct. 8, 1921
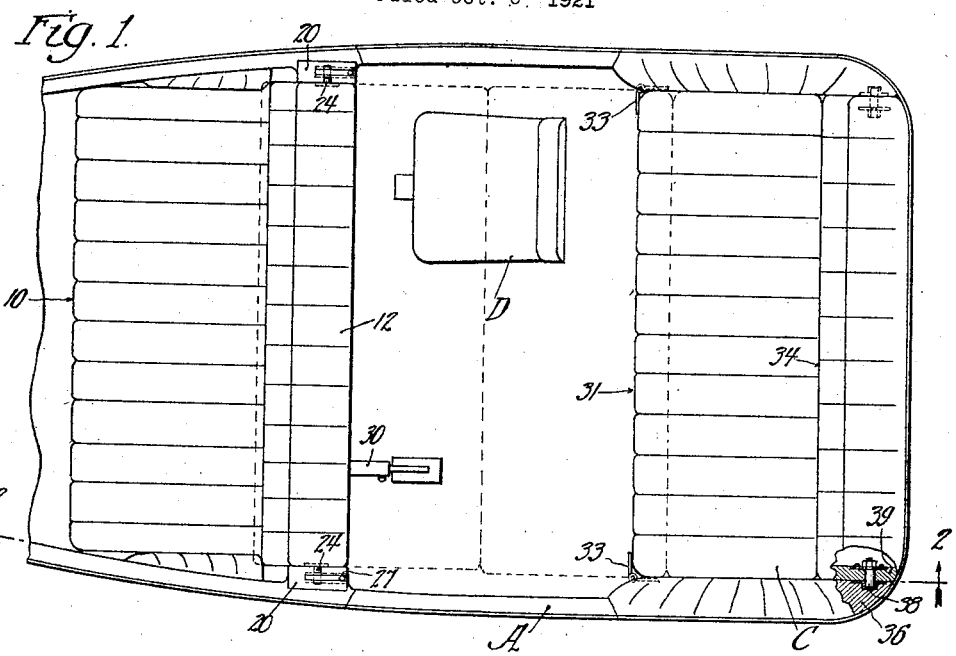
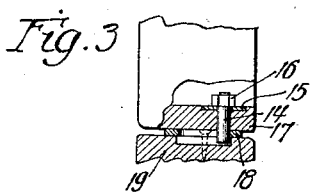
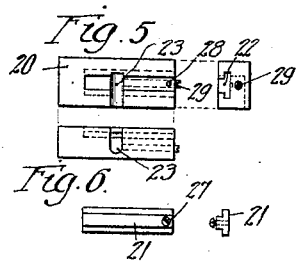
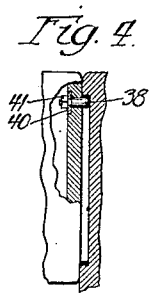
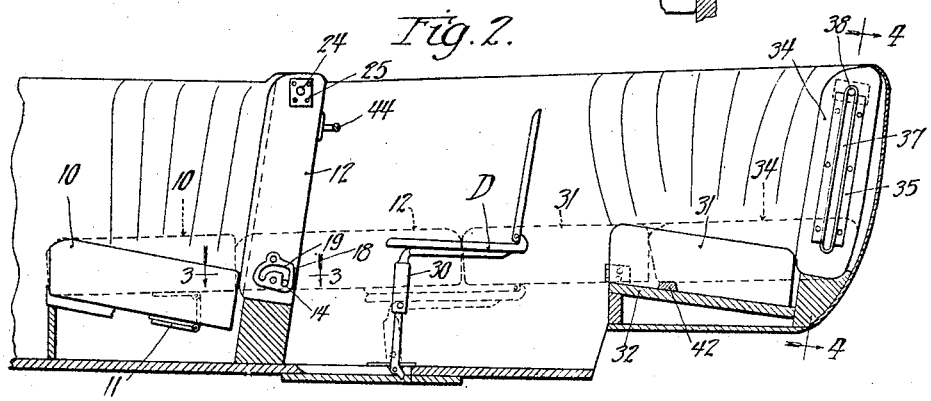
Inventor.
Gatt H. Wong.
By: Gabel + Mueller
Attys.

Patented May 1, 1923.

1,453,372

UNITED STATES PATENT OFFICE.

GATT H. WONG, OF CHICAGO, ILLINOIS.

CONVERTIBLE AUTOMOBILE BODY.

Application filed October 8, 1921. Serial No. 506,331.

*To all whom it may concern:*

Be it known that I, GATT H. WONG, a citizen of the Republic of China, residing at Chicago, in the county of Cook and State of Illinois, U. S. A., have invented a certain new and useful Improvement in Convertible Automobile Bodies, of which the following is a full, clear, concise, and exact description, reference being had to the accompanying drawings, forming a part of this specification.

My invention relates to convertible automobile bodies and has to do more particularly with bodies of that character wherein the seats are arranged to be converted into a bed. A feature of my invention is the provision of an improved structure of this character in which the front and rear seats are arranged so as to have the seat cushions and back rests shiftable into horizontal alignment so as to provide a bed inside of the body of the car.

For a better understanding of my invention reference is to be had to the accompanying drawing in which—

Fig. 1 is a plan view of an automobile body showing the seats in ordinary riding position;

Fig. 2 is a sectional view along the line 2—2 of Fig. 1;

Fig. 3 is a sectional view along the line 3—3 of Fig. 2, through one of the hinges at the bottom of the front seat back rest;

Fig. 4 is a sectional view along the line 4—4 of Fig. 2 showing the rear seat back rest sliding hinge construction;

Fig. 5 is a top, front, and right end view of a lock for the front seat back rest; and Fig. 6 is a top and right end view of the bolt which slides into the lock body shown in Fig. 5.

Referring now more in detail to the construction of my invention as illustrated herein, I have shown a typical automobile body A having a front seat B, rear seat C and extra or intermediate seats D.

In the front seat construction I preferably employ the usual seat cushion 10 which normally rests in an angular position but having a hinged foot 11 secured to its bottom so that it may be lifted into a horizontal position as indicated by the dotted lines. The back rest 12 of the front seat is arranged to be tilted back into the horizontal position indicated by the dotted lines and to this end I provide a sliding hinge arranged so that the back rest is first lifted upwardly and then tilted backwardly and thereafter moved forwardly against the front seat cushion. This front back rest has such a hinge at each end, said hinge comprising a stud 14 secured in a plate 15 by a bolt 16, the plate being suitably secured inside the side frame 17 and projecting through the hinge plate 18 which is secured to the body frame 19. Said plate 18 is slotted at 49 with an abrupt rise at the rear portion so as to permit a vertical movement of the back rest 12 and stud 14. At the top of each end of the back rest where it adjoins the body frame I provide a locking device in the form of a block 20 having a bolt 21 slidably mounted in the horizontal slot 22. A vertical slot 23 is also provided for receiving a horizontally extending stud 24 which is rigidly fastened to a plate 25 attached to the side frame of the back rest. With the seat in its normal or riding position this locking stud 24 rests in the bottom of the slot 23 being held therein against vertical movement by the bolt or sliding plate 21. In order to hold this bolt 21 in place, and keep it from coming out from vibrations of the car, I lock it in its closed position by a set screw 27 which is adapted to be turned down into the recess 28 in the block 20. In order to lock the stud and thereby also the back rest 12 and body sides from chattering or relative vibration I lock the stud 24 by a set screw 29 carried in the body 20 of the lock.

In Figs. 5 and 6 I have shown the lock for the right side of the car but it will be apparent that the left side lock will be the same except a reversal of the slot 23.

The body illustrated herein is of the seven passenger type and therefore, I have shown two intermediate or extra seats D which are of the usual folding type adapted to be tilted forwardly against the back of the front seat. These seats, however, differ from the ordinary type in that the legs 30 thereof are vertically adjustable so that the seat may be lowered into the position indicated by the dotted lines in Fig. 2 and thereby act as a support for the back rest of the front seat and the seat cushion of the rear seat. This adjustment is provided because it is more comfortable to have the seat elevated as indicated by the full lines in Fig. 1 when using it for seating purposes.

Now as to the rear seat construction I preferably arrange the rear seat cushion 31 so that it may be shifted forwardly into the position indicated by the dotted lines where it is in horizontal alignment with the front cushions 10—12, preferably resting upon the intermediate seats D. Ordinarily the rear seat cushions as 31 are retained in their riding position by a thin metal strip secured to the front of the seat support 32 but this would not permit of an effective support for the seat cushion and, therefore, I provide a pair of hinge retaining members 33 which when in their normal position as shown in Fig. 1, prevent a forward movement of the seat cushion 31. In order to shift this cushion to its bed position it is lifted out of its resting place and the hinge members 33 turned back. The seat is then placed in its forward position resting on the intermediate seat D and cushion support 32, as indicated by the dotted lines.

The back rest 34 for the rear seat is arranged to be drawn forwardly into its dotted line position and to this end I provide a slotted hinge or support at each side end of the back rest. This sliding hinge includes an elongated member formed up of sheet metal having side flanges 35 for securing it to the framework 36 of the body. A central slot 37 extends along the slide and receives a horizontally extending stud 38 secured to the end frame 39 by means of a plate 40. The stud 38 is fastened to the plate by a shouldered threaded end which receives a nut 41. Thus, this hinged stud is inserted through the walls of the rear back rest and then its plate 40 fastened thereto in a suitable manner preferably by a sufficient number of screws extending therethrough.

To shift the rear seat back rest into its horizontal or bed position the bottom part is pulled forwardly and thereby dropping the top part downwardly until the studs 38 rest in the bottom of the slot 37. The front edge of the back rest 34 then rests upon a suitable support 42.

To convert the body from a riding position to a bed construction the front seat cushion 10 is simply lifted into its dotted line position thereby dropping the folding legs 11 so as to keep the cushion in a horizontal position.

The extra seats D are then lowered into their dotted line position by adjusting the legs 30 thereof, also lowering the back rests.

The locks at the top of the side ends are then released by unscrewing the set screws 27—29 therein and withdrawing the slide or bolt 21 clear of the slot 23. The handle or usual robe rail 44 is then grasped and the back rest 12 lifted vertically to the extent of the movement of stud 14 in the slot 19 of the hinge. This raises the locking studs 24 free of the slots 23 in the locking blocks so that the back may be lowered backwardly into its horizontal position after which it is shifted forwardly in the hinge slots 19 to abut the front seat cushion 10.

The rear seat cushion is then lifted out of its riding position and hinges 33 folded back after which the seat 31 is placed in its forward or bed position as indicated by the dotted lines.

The rear seat back rest 34 is now moved into its horizontal bed position by pulling the lower end forward thereby permitting the upper end to slide downwardly in the slotted hinge and the back placed in its horizontal position abutting the cushion 31, as indicated by the dotted lines.

To convert the bed construction to a riding position it is only necessary to reverse the operations just described and it will be apparent that by the simple arrangement of hinges and shiftable cushions the conversion from one to the other is very readily and easily performed, taking but a few moments.

For the purpose of illustration I have shown a preferred form of construction using a seven passenger type of body but when using my invention with the ordinary five passenger body in which the extra seats are not provided I simply provide suitable supports which may be of the character used on the extra seats shown.

What I claim as new and desire to secure by U. S. Letters Patent is:—

1. In a convertible automobile body of the character described, front and rear seats having seat-cushions and back-rests, the seat-cushions and back-rests being readily adjustable into horizontal alignment so as to form a bed, means whereby the front seat-cushion may be raised from an angular to a horizontal position, a slidably pivotal hinge mounted at each end of the front back-rest whereby said back-rest may be tilted backwardly into horizontal alignment with the seat-cushion and slid into abutment therewith, means whereby the rear seat-cushion may be slid forwardly and supported in horizontal alignment with the front back-rest, and a slidably pivotal hinge mounted at each end of the rear seat back-rest whereby the bottom of the rear back-rest may be drawn forwardly to the rear seat-cushion and the top of the back-rest dropped downwardly.

2. In an automobile body of the character described having cushioned sides, front and rear seats having seat-cushions and back-rests, and means for readily adjusting the seat cushions and back-rests into horizontal alignment between the side cushions, said means including a support for holding the front seat-cushion horizontally, a hinge having a slidable pivot for securing the bottom of the back-rest of the front seat at its sides whereby it may be tilted backward horizontally and shifted forwardly to abut the seat cushion and a support therefor, a support for the rear seat-cushion whereby it may be drawn forwardly to rest on said front back-rest support, and a sliding connection mounted between the back-rest and side at each end thereof for supporting the back-rest of the rear seat whereby the bottom end may be drawn forwardly between the side cushions to the rear seat-cushion so as to drop the top end down to horizontal alignment with the front end.

In witness whereof, I hereunto subscribe my name this 30th day of September A. D., 1921.

GATT H. WONG.